Patented Aug. 4, 1942

2,292,129

UNITED STATES PATENT OFFICE 2,292,129

OXIDATION OF TRICHLORETHYLENE

Frederick William Kirkbride, Runcorn, England, assignor to Imperial Chemical Industries Limited, a corporation of Great Britain No Drawing. Application December 15, 1939, Serial No. 309,349. In Great Britain January 4, 1939

2 Claims. (Cl. 204—163)

This invention relates to the oxidation of trichlorethylene.

It is known that trichlorethylene can be converted by oxygen into oxidation products, the gases HCl, CO and $COCl_2$ being formed, together with dichloracetyl chloride. It has also been proposed to treat hot trichlorethylene with gaseous oxygen whereby a mixture of reaction products is obtained containing dichloracetyl chloride, a second compound believed to be trichlorethylene oxide, and higher boiling substances including hexachlorbutylene and other products of undetermined constitution; the oxide can be converted to the chloride by heating, or by treatment with organic nitrogen bases, especially secondary or tertiary amines, or to chloral by treatment with anhydrous metallic chlorides decomposable by water such as aluminium chloride.

The formation, during the oxidation step, of hexachlorbutylene and the other products of undetermined constitution considerably reduces the yield of trichlorethylene oxide and dichloracetyl chloride.

According to the present invention trichlorethylene is oxidised by treatment with gaseous oxygen while exposed to actinic radiation, e. g., the light from a mercury arc lamp, at least up to the stage where the reaction liquor has acquired an acid value, as hereinafter defined, of 3N and preferably between 15N and 20N, any subsequent treatment with oxygen being carried out at an elevated temperature, suitably at a temperature above 50° C. and preferably between 65° and 75° C.

When oxidising trichlorethylene by this method not only does the reaction proceed readily at lower temperatures than have been hitherto used, e. g., at 40° to 50° C. and even at ordinary temperatures, but there is less formation of unwanted higher boiling products, and the reaction liquor contains a higher proportion of the product believed to be trichlorethylene oxide.

As the oxidation of the trichlorethylene proceeds the quantity of the acid chloride or of the oxide will, of course, gradually increase. These products can be decomposed by water with the formation of hydrochloric acid and other acid products, which dissolve in the aqueous layer and can be estimated by titrating the latter with standard alkali, the reaction liquor can thus be said to acquire an "acid value" which can be used to determine the extent to which oxidation has been carried out. In this specification the term "acid value" is used in this sense, and the reaction liquor is said to have acquired a certain normality, the normality being the number of volumes of normal alkali required to neutralise the acid aqueous layer obtained on agitating unit volume of the reaction liquor with water. It should be understood that the reaction of the oxidized liquor with water is not a simple neutralisation, but is more complex, involving the decomposition of any oxide present; thus the "acid value" will not be the same after converting the trichlorethylene oxide to the acid chloride. The acid values quoted in this specification are determined before the reaction liquor is subjected to any conversion treatment.

The trichlorethylene may be exposed to actinic radiation throughout the oxidation process, in which case the oxygen is bubbled through an agitated charge of liquid for some time, e. g., up to 4 days, while maintaining the necessary temperature. It will frequently be the case that no external heating is necessary, the source of actinic radiation also radiating sufficient heat to warm the liquid sufficiently; in some cases external cooling may be required.

It is not essential, however, to continue the exposure to light throughout the oxidation, for once the reaction liquor has acquired an acid value above 3N and preferably between 15N and 20N, the source of actinic radiation can be extinguished, and the oxidation completed while maintaining a temperature above 50° C. and preferably between 65° and 70° C.

It is one advantage of this procedure that a continuous method of operation can be readily devised which does not depend for success on continuous exposure to actinic radiation, and thus is neither dislocated by failure of the light supply nor requires as large an energy consumption. The continuous method of operation may be carried out by providing a reaction vessel fitted with temperature regulating means, inlets for oxygen and for trichlorethylene, outlets for gaseous and for liquid reaction products, and a source of actinic radiation. The vessel is filled with a charge of trichlorethylene which is then irradiated while oxygen is passed in, and the temperature is allowed to rise to between 65° C. and 70° C. Samples of the liquid are withdrawn from time to time and the "acid value" of the samples determined as described above. When the "acid value" has reached a suitable value, for example between 15N and 20N irradiation is stopped and the withdrawal of reaction liquid and the introduction of fresh trichlorethylene commenced. The rate at which the reaction liquid is replaced by trichlorethylene is regulated so as to maintain a suitable volume of liquid in the reaction vessel and to maintain the acid value between 15N and 20N, this being determined by periodic determination of the acid value of the effluent liquid. The temperature regulating means is actuated to maintain the temperature between the chosen limits; in the absence of illumination no external heating or cooling may be required, though during the earlier stages of the process the source of actinic radiation may also radiate more than sufficient heat to maintain the required temperature, and artificial cooling will then be necessary.

This process is capable of variation without departing from the scope of this invention. Thus instead of restricting the inflow of trichlorethylene to maintain a steady "acid value" in the effluent, a somewhat greater inflow may be used, and the reaction liquid irradiated intermittently to prevent the "acid value" becoming too small. Again it may in some cases be desirable to interrupt the process for a short time, e. g., due to temporary failure in a subsequent process for treating the crude reaction product or for other reasons. In such cases the oxidation process can be started up again without further illumination if on stopping the process a charge of reaction liquor is retained in the reaction vessel which has the appropriate "acid value," i. e., between 15N and 20N; heating to the reaction temperature and recommencement of the flow of reactants is all that is then required to recommence the process.

The liquor obtained from the oxidation of trichlorethylene can be distilled under reduced pressure, e. g., 100 mm. to 300 mm. of mercury, to remove unchanged trichlorethylene, though in the process some of the oxide may be converted to dichloracetyl chloride and thus a pure oxide will not be obtained. Alternatively all of the oxide may be converted to dichloracetyl chloride by continued heating or preferably by the aid of a small quantity of a secondary or tertiary amine such as dimethylamine, diethylamine, dimethylaniline or pyridine, which act as catalysts. The conversion is an exothermic one, and to avoid too vigorous a reaction the oxide-containing liquor should be added to a quantity of the preformed dichloracetyl chloride in which the catalyst is dissolved.

Alternatively, chloral may be obtained by treatment with an anhydrous metallic chloride, such as aluminium chloride or antimony chloride, which is decomposed by water.

The resulting dichloracetyl chloride can in turn be worked up, e. g., distilled to remove the small quantities of higher boiling products which may be formed even according to this improved process, and/or converted to other chloracetyl products.

Examples of such conversion products are esters, which may be obtained by refluxing the acid chloride with the appropriate alcohol. Amides may also be obtained by treating the chloride with ammonia gas, removing precipitated ammonium chloride by filtration, extracting the residue on the filter with a solvent, e. g., trichlorethylene and isolating the amide by evaporation and crystallisation of the combined liquors.

It is, of course, known to stabilize chlorinated hydrocarbons such as trichlorethylene with small amounts of stabilizers, in particular secondary or tertiary amines, and it will be apparent that in the oxidation step, trichlorethylene should be used which is free from such stabilizing agents.

The following examples illustrate but do not limit this invention, all parts being by weight.

*Example I*

A Pyrex vessel ("Pyrex" is a registered trademark) containing 550 parts of trichlorethylene was mounted above a quartz mercury arc lamp, and dry oxygen was bubbled through at the rate of 7.2 parts per hour. Some gaseous oxidation products were formed which, together with unreacted oxygen, were allowed to escape through a cooled reflux condenser to remove trichlorethylene vapour. As a result of the proximity of the vessel to the arc lamp the temperature rose to 46° C. After 41 hours the introduction of gas was discontinued and it was found that the liquid had acquired an acid value of 25N. The crude reaction product containing trichlorethylene oxide and weighing 508 parts was then added slowly to 0.5 part of triethylamine dissolved in a small amount of dichloracetyl chloride contained in a vessel fitted with a reflux condenser, the rate of addition being such that the liquid was maintained in gentle ebullition. The product (after allowing for the dichloracetyl chloride in which the amine was dissolved) weighed 500 parts, 422 parts of which were dichloracetyl chloride, representing a yield on the original trichlorethylene of 68%.

On fractional distillation the crude product yielded pure dichloracetyl chloride, unchanged trichlorethylene (which could be used again in a second oxidation) and a small amount of polymerisation products.

*Example II*

An amount of trichlorethylene weighing 515 parts was exposed in a glass vessel to the light from a mercury arc lamp, and a stream of oxygen was passed in at the rate of 6.7 parts per hour. The temperature rose to 70° C. After 8.8 hours, the liquid in the vessel acquired an acid value of 5.5N and the arc lamp was then switched off and the introduction of oxygen continued while maintaining the temperature at 70° C. by heating. After 31 hours the acid value had risen to 23.5N and the oxidation process was then stopped. The reaction liquor was then treated with 0.1% triethylamine when 438 parts of product were obtained containing 77% dichloracetyl chloride, corresponding to a 58% conversion of the trichlorethylene.

*Example III*

A reaction vessel was fitted with a lid, inlet pipes for oxygen and trichlorethylene reaching nearly to the bottom of the vessel, a run-off pipe near the top for reaction liquor and effluent gas and a glass socket of Pyrex ("Pyrex" is a registered trade-mark), in which a mercury arc lamp could be placed to illuminate the interior. A charge of 33 parts of trichlorethylene was placed in the vessel, the temperature raised to 70° C. by switching on the lamp, and oxygen was then introduced at the rate of 0.27 part per hour until the acid value of a sample of the charge was 20N. Oxygen was thereafter introduced at the rate of 0.27 part per hour and trichlorethylene at the rate of 1.76 parts per hour, and illumination was discontinued. A continuous run-off of liquor was thus obtained having an approximately constant acid value between 18N and 20N, and after treatment with triethylamine gave a crude product containing 70% dichloracetyl chloride;

the rate of production of the crude product was 1.7 parts per hour. Thus a 60% conversion of the trichlorethylene was achieved.

I claim:

1. A continuous process for converting trichlorethylene to dichloracetyl chloride and trichlorethylene oxide by oxidation which comprises passing gaseous oxygen free from chlorine thru a charge of trichlorethylene which is being irradiated with ultraviolet light until it has acquired an acid value of at least 3N and thereafter, while maintaining the temperature of said charge above 50° C., passing gaseous oxygen thru said charge, adding fresh trichlorethylene to said charge and withdrawing oxidized liquor from said charge at such rates that the acid value of said charge does not go below 3N.

2. A continuous process for converting trichlorethylene to dichloracetyl chloride and trichlorethylene oxide by oxidation which comprises passing gaseous oxygen thru a charge of trichlorethylene which is being irradiated with light from a mercury arc lamp until said charge has acquired an acid value of 15N to 20N and a temperature between 65° C. and 75° C., discontinuing irradiation of said charge, continuing the passage of gaseous oxygen thru said charge, and while maintaining the temperature of said charge between 65° C. and 75° C., adding fresh trichlorethylene thereto and withdrawing oxidized liquor therefrom at such rates that the acid value of said charge is maintained at from 15N to 20N.

FREDERICK W. KIRKBRIDE.